No. 850,527. PATENTED APR. 16, 1907.
C. P. ELLIS.
BICYCLE SUPPORT.
APPLICATION FILED OCT. 19, 1906.
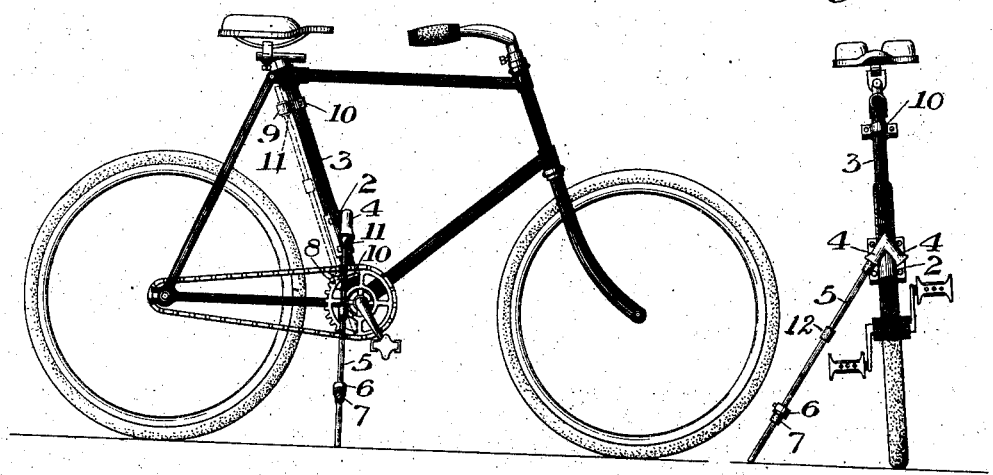
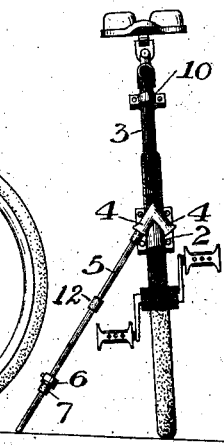
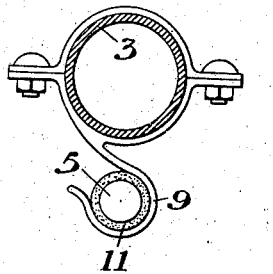
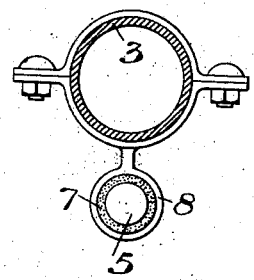
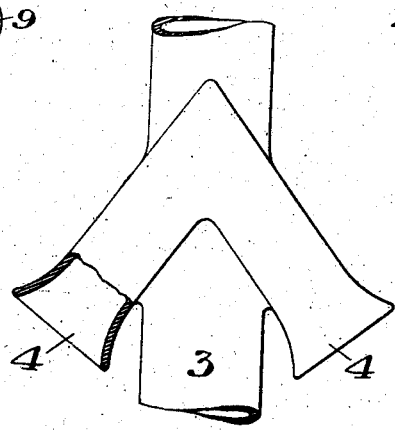
WITNESSES
W. W. Swartz
R. A. Balderson
INVENTOR
Charles P. Ellis

UNITED STATES PATENT OFFICE.

CHARLES P. ELLIS, OF NEW YORK, N. Y.

BICYCLE-SUPPORT.

No. 850,527.      Specification of Letters Patent.      Patented April 16, 1907.

Application filed October 19, 1906. Serial No. 339,635.

*To all whom it may concern:*

Be it known that I, CHARLES P. ELLIS, of New York, New York county, New York, have invented a new and useful Improvement in Bicycle-Supports, of which the following is a full, clear, and exact description, reference being had to the accompanying drawings, forming part of this specification, in which—

Figures 1 and 2 are side and front elevations, respectively, of a bicycle provided with my improved support in position, a portion of the bicycle being broken away in Fig. 2. Figs. 3 and 4 are cross-sections showing the supports for the brace, and Fig. 5 is a detail view showing a modified form of socket attachment.

My invention relates to the class of bicycle-supports, and is designed to provide a simple, cheap, and efficient device of this character which will support the wheel from either side, as may be desired.

In the drawings, 2 represents a socket-plate, which may be made in two parts, as shown, and secured to the seat-post 3 of the bicycle-frame by screw or other bolts, as shown. Upon this plate are provided the angular downwardly-opening sockets 4 4, which are preferably-flared or tapered outwardly so as to permit easy insertion of the brace 5. This brace consists of a metal tube, having near its lower end an adjustable ring 6, below which is a rubber gasket 7, having two portions of different diameters, the smaller portion being arranged to rest with a ring 8, secured to the rear portion of the post 3 near its lower end, while the large portion of the gasket rests upon this ring. When not in use, the brace is adjusted in the rear of the post, as shown in Fig. 1, with its lower gasket fitting in the ring 8 and its upper end held within a spring-clamp 9. The clamp 9 and the ring 8 may be secured to suitable clips 10, by which they are fastened to the post in any desired position. The brace is preferably provided with an upper yielding gasket or ring 11, which is held within the clamp 9, thus preventing any rattling of the brace when held in the rear of the post, and with an intermediate yielding gasket 12 to prevent defacing of the brace when contacting with the pedal.

The operation of the support will be apparent to those skilled in the art. When the wheel is at rest, the brace is removed from its support and its upper end thrust into one of the inclined sockets, the wheel being tilted slightly on that side on which the brace is placed, as shown in Fig. 2. It will be noted that when in this position the pedal will contact with the brace if the bicycle is upon an incline and starts to move in either direction, so that the brace acts not only as a support, but as a lock. The pedal may be placed against the brace on the proper side to prevent the bicycle moving in either direction when the brace is inserted. In place of providing a socket-plate which is removably secured to the frame these sockets may be brazed or welded directly to the frame, as shown in Fig. 5, the operation being the same as before.

The advantages of my invention result from the fact that the support may be placed on either side of the bicycle by reason of the sockets extending in opposite directions. This avoids the necessity for turning the bicycle around in order to get a proper support on slanting ground. The brace is securely held in its place in the rear of the frame-post, where it will not interfere with other attachments and is easily and quickly removed and replaced. The lower gasket may be made in two parts. The clips may be secured by other means, and many changes in the shape and length of the brace, as well as the shape and position of the sockets and other parts, may be made without departing from my invention, since

What I claim is—

1. In a bicycle-support, a brace member having two downwardly and laterally diverging legs, each of which constitutes a socket, a brace-rod adapted to be inserted in either one of the sockets, and means for securing said member to a bicycle-frame; substantially as described.

2. In a bicycle-support, the combination with a socket-plate removably secured to the lower portion of the seat-post, said plate having oppositely-extending bell-mouthed sockets, of a brace arranged to be inserted in either socket, and clips upon the frame arranged to hold the brace when not in use.

3. The combination with the seat-post of a bicycle-frame, of a ring secured thereto, a brace having a collar arranged to rest upon the ring, and a spring-clip arranged to hold the upper portion of the brace.

4. The combination with the seat-post of a bicycle-frame, of a ring secured thereto, a brace having a collar provided with a gasket resting upon and within the ring, a spring-clip arranged to hold the upper end of the brace, said brace having an upper gasket arranged to contact with the clip and also an intermediate gasket to contact with the pedal, the gaskets being arranged to prevent rattling and defacing of the parts.

In testimony whereof I have hereunto set my hand.

CHARLES P. ELLIS.

Witnesses:
WM. WALLENFELS,
ARTHUR J. SOVAK.